United States Patent
Otake et al.

(10) Patent No.: US 12,168,745 B2
(45) Date of Patent: Dec. 17, 2024

(54) ULTRAVIOLET RAY CURABLE SILICONE ADHESIVE COMPOSITION AND CURED PRODUCT THEREOF

(71) Applicant: SHIN-ETSU CHEMICAL CO., LTD., Tokyo (JP)

(72) Inventors: Kohei Otake, Annaka (JP); Taichi Kitagawa, Annaka (JP); Nobuaki Matsumoto, Annaka (JP); Toshiyuki Ozai, Annaka (JP); Yoshinori Ogawa, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 793 days.

(21) Appl. No.: 17/292,609

(22) PCT Filed: Oct. 25, 2019

(86) PCT No.: PCT/JP2019/041891
§ 371 (c)(1),
(2) Date: May 10, 2021

(87) PCT Pub. No.: WO2020/105365
PCT Pub. Date: May 28, 2020

(65) Prior Publication Data
US 2022/0002595 A1 Jan. 6, 2022

(30) Foreign Application Priority Data
Nov. 21, 2018 (JP) .................. 2018-217910

(51) Int. Cl.
| | | |
|---|---|---|
| C08F 2/46 | (2006.01) | |
| C08F 2/50 | (2006.01) | |
| C08G 61/04 | (2006.01) | |
| C09J 4/06 | (2006.01) | |
| C09J 7/38 | (2018.01) | |
| C09J 11/04 | (2006.01) | |

(52) U.S. Cl.
CPC .............. C09J 7/385 (2018.01); C09J 4/06 (2013.01); C09J 11/04 (2013.01); C09J 2203/326 (2013.01); C09J 2301/302 (2020.08); C09J 2433/00 (2013.01); C09J 2483/00 (2013.01)

(58) Field of Classification Search
CPC ..... C08G 77/70; C08G 77/20; C08F 290/068; C08F 220/1811; C08K 6/36; C08K 5/07; C09J 183/04; C09J 183/06; C09J 7/385; C09J 51/085; C09J 4/06; C09J 11/04; C09J 2483/00; C09J 2301/302; C09J 2433/00; C09J 2203/326; C08L 83/00
USPC ........... 522/42, 33, 6, 189, 184, 71, 1; 520/1
See application file for complete search history.

(56) References Cited

U.S. PATENT DOCUMENTS 11,124,680 B2 * 9/2021 Otake ................. C08F 283/124
2020/0131408 A1 * 4/2020 Otake ....................... C09J 7/385

FOREIGN PATENT DOCUMENTS

| CN | 105164168 A | 12/2015 | |
|---|---|---|---|
| JP | 2631098 B2 | 7/1997 | |
| JP | 2002-521513 A | 7/2002 | |
| JP | 2002302664 | * | 10/2002 |
| JP | 2002302664 A | * | 10/2002 |
| JP | 4100882 B2 | 6/2008 | |
| JP | 5234064 B2 | 7/2013 | |
| JP | 5825738 B2 | 12/2015 | |
| JP | 2016190979 | * | 11/2016 |
| JP | 2016190979 A | * | 11/2016 |

(Continued)

OTHER PUBLICATIONS

Hara et al, JP 2002-302664 Machine Translation, Oct. 18, 2002 (Year: 2002).*

(Continued)

*Primary Examiner* — Jessica Whiteley
(74) *Attorney, Agent, or Firm* — Birch, Stewart, Kolasch & Birch, LLP

(57) ABSTRACT

(A) an organopolysiloxane having, per molecule, two groups each represented by formula (1)

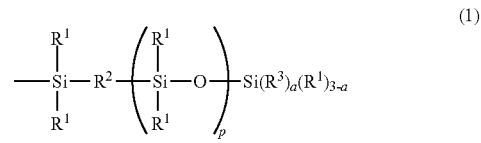

($R^1$ represents a $C_{1-20}$ monovalent hydrocarbon group, $R^2$ represents an oxygen atom or the like, $R^3$ represents an acryloyloxyalkyl group or the like, and p and a respectively represent numbers satisfying 0-10 and 1-3);
(B) a monofunctional (meth)acrylate compound not including a siloxane structure;
(C) an organopolysiloxane resin which comprises a unit (a) represented by formula (2)

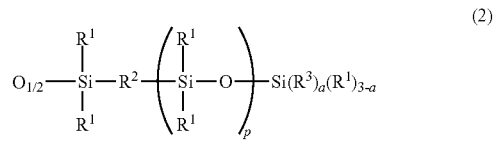

($R^1$, $R^2$, $R^3$, a, and p are identical to those described above), a $R^4_3SiO_{1/2}$ unit (b) (in the formula, $R^4$ represents a monovalent hydrocarbon group having 1-10 carbon atoms), and a $SiO_{4/2}$ unit (c), and in which the mole ratio of the total of units (a) and (b) to unit (c) is in a range of 0.4 to 1.2:1; and
(D) a photoinitiator.

10 Claims, 1 Drawing Sheet

(56) References Cited

FOREIGN PATENT DOCUMENTS

| KR | 10-2016-0129219 A | 11/2016 | |
|---|---|---|---|
| WO | WO 00/05291 A1 | 2/2000 | |
| WO | WO-0005291 A1 * | 2/2000 | ............. C08G 77/20 |
| WO | WO 2008/088069 A1 | 7/2008 | |
| WO | WO 2017/048890 A1 | 3/2017 | |

OTHER PUBLICATIONS

Iwata et al, JP 2016-190979 Machine Translation, Oct. 10, 2016 (Year: 2016).*
Extended European Search Report for corresponding European Application No. 19887980.1, dated Jul. 20, 2022.
Chinese Office Action and Search Report for Chinese Application No. 201980075863.6, dated Mar. 11, 2023.
International Search Report, issued in PCT/JP2019/041891, PCT/ISA/210, dated Dec. 3, 2019.
Rogers et al., "Transfer printing by kinetic control of adhesion to an elastomeric stamp", Nature Materials, Nature Publishing Group, Dec. 11, 2005, vol. 6, p. 33-38.
Written Opinion of the International Searching Authority, issued in PCT/JP2019/041891, PCT/ISA/237, dated Dec. 3, 2019.

* cited by examiner

ULTRAVIOLET RAY CURABLE SILICONE ADHESIVE COMPOSITION AND CURED PRODUCT THEREOF

TECHNICAL FIELD

This invention relates to a UV-curable silicone pressure-sensitive adhesive (PSA) composition and a cured product thereof, and more particularly, to a UV-curable silicone PSA composition and a cured product thereof which can be advantageously used as a temporary adhesive or fixing material for transferring objects.

BACKGROUND ART

Modern electronic tools as typified by smartphones, liquid crystal displays and automotive parts are required to meet not only high performance, but also space and energy savings at the same time. In response to the social demands, electric and electronic parts mounted on such tools are tailored for further size reduction or miniaturization. Their assembly steps become more complicated and difficult annually.

The technology capable of transferring miniaturized chips or parts selectively and simultaneously was recently developed (Non-Patent Document 1), with attention being paid thereon.

This technology is known as micro-transfer-printing technique, including the steps of picking up microscale parts at a time with the adhesive force of elastomer and transferring them to the desired destination.

PSA articles obtained by curing and molding silicone PSA compositions on substrates or the like are utilized as the micro-transfer-printing material.

Silicone elastomers are known as the PSA material in this application. Many solventless silicone base PSA compositions of heat cure type are proposed (Patent Documents 1 to 3).

On use of solventless silicone PSA compositions of heat cure type, however, there is the problem that the cured product shrinks upon cooling to room temperature after heat curing, resulting in pattern features with increased dimensional errors.

These PSA compositions contain as a tackifier a solid resin component which does not participate in crosslinking. The uncrosslinked resin component can cause adhesive migration and be left on chips or parts when used as the micro-transfer-printing material.

Furthermore, these materials are insufficient in strength and can undergo cohesive failure upon material molding and transferring of chips or parts.

On the other hand, there is developed a silicone resin composition which can be briefly cured at room temperature via UV irradiation and is excellent in dimensional accuracy (Patent Document 4). This composition also contains a non-crosslinkable resin component, failing to suppress adhesive migration.

Therefore, there is a need for a PSA silicone material of UV cure type which can be briefly cured at room temperature via UV irradiation, is free of uncrosslinked component, and has satisfactory adhesive force and rubber strength.

PRIOR ART DOCUMENTS

Patent Documents

Patent Document 1: JP 5825738
Patent Document 2: JP 2631098
Patent Document 3: JP 5234064
Patent Document 4: JP 4100882

Non-Patent Documents

Non-Patent Document 1: John A. Rogers, "Transfer printing by kinetic control of adhesion to an elastomeric stamp," Nature Materials, Nature Publishing Group, 11 Dec. 2005, vol. 6, p. 33-38

SUMMARY OF INVENTION

Technical Problem

An object of the invention, which has been made under the above-mentioned circumstances, is to provide a UV-curable silicone PSA composition which cures into a cured product having excellent pressure-sensitive adhesion as a temporary adhesive or fixing material, and the cured product.

Solution To Problem

Making extensive investigations to attain the above object, the inventors have found that using an organopolysiloxane having a specific (meth)acryloyloxy-containing group, a siloxane structure-free monofunctional (meth)acrylate compound, and an organopolysiloxane resin having a specific (meth)acryloyloxy-containing group, there is obtained a UV-curable silicone composition which is briefly cured via UV irradiation into a cured product having satisfactory adhesion and rubber strength despite the absence of non-crosslinkable resin. The invention is predicated on this finding.

The invention is defined below.

1. A UV-curable silicone pressure-sensitive adhesive composition comprising:

(A) 100 parts by weight of an organopolysiloxane containing per molecule two groups having the general formula (1):

[Chem. 1]

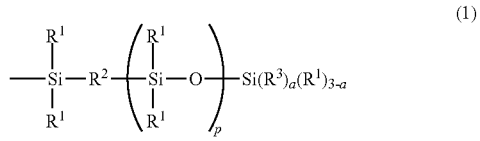

wherein $R^1$ is each independently a $C_1$-$C_{20}$ monovalent hydrocarbon group, $R^2$ is oxygen or a $C_1$-$C_{20}$ alkylene group, $R^3$ is each independently an acryloyloxyalkyl, methacryloyloxyalkyl, acryloyloxyalkyloxy or methacryloyloxyalkyloxy group, p is a number of 0 to 10, and "a" is a number of 1 to 3, (B) 1 to 200 parts by weight of a monofunctional (meth)acrylate compound free of a siloxane structure, (C) 1 to 1,000 parts by weight of an organopolysiloxane resin comprising (a) units having the general formula (2):

[Chem. 2]

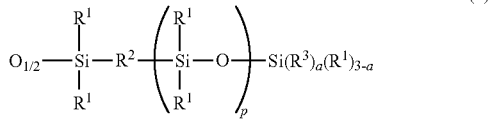

(2)

wherein $R^1$, $R^2$, $R^3$, a, and p are as defined above, (b) $R^4{}_3SiO_{1/2}$ units wherein $R^4$ is a $C_1$-$C_{10}$ monovalent hydrocarbon group, and (c) $SiO_{4/2}$ units, a molar ratio of the total of units (a) and (b) to units (c) being in the range of from 0.4:1 to 1.2:1, and (D) 0.01 to 20 parts by weight of a photopolymerization initiator, the composition being free of a non-crosslinkable organopolysiloxane resin.

2. The UV-curable silicone pressure-sensitive adhesive composition of 1, further comprising (E) 1 to 20 parts by weight of finely divided silica per 100 parts by weight of component (A).

3. The UV-curable silicone pressure-sensitive adhesive composition of 1 or 2, further comprising (F) 0.001 to 10 parts by weight of an antistatic agent per 100 parts by weight of component (A).

4. A cured product of the UV-curable silicone pressure-sensitive adhesive composition of any one of 1 to 3.

5. The cured product of 4 having a tensile strength of at least 1 MPa according to JIS-K6249 at a thickness of 2.0 mm.

6. A pressure-sensitive adhesive agent comprising the cured product of 4 or 5.

7. A pressure-sensitive adhesive sheet comprising the cured product of 4 or 5.

8. A microstructure-transferring stamp comprising the cured product of 4 or 5.

9. The microstructure-transferring stamp of 8 having at least one protrusion structure.

10. A microstructure-transferring apparatus comprising the microstructure-transferring stamp of 8 or 9.

11. A microstructure-holding substrate having a pressure-sensitive adhesive layer comprising the cured product of 4 or 5.

12. A microstructure-transferring apparatus comprising the microstructure-holding substrate of 11.

Advantageous Effects of Invention

The UV-curable silicone rubber PSA composition of the invention is effectively curable upon UV irradiation. Its cured product has excellent pressure-sensitive adhesion and rubber strength as a temporary adhesive or fixing material. The composition is successful in suppressing adhesive migration because a non-crosslinkable resin is not contained.

DESCRIPTION OF EMBODIMENTS

Figure 1:
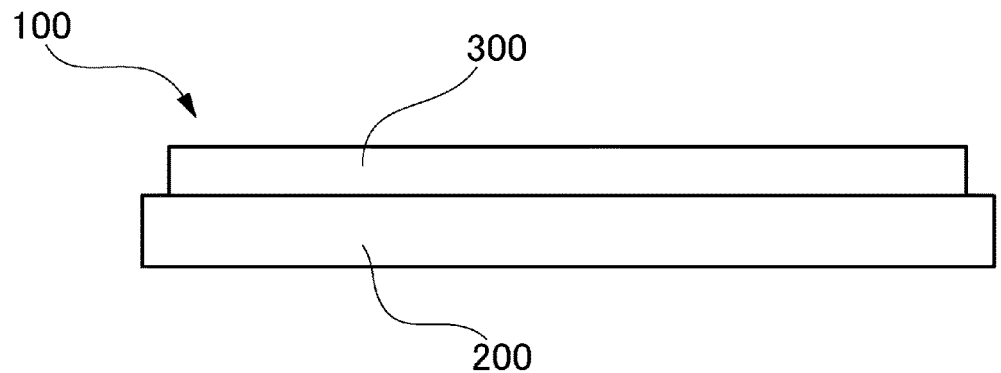
FIG. 1 is a schematic view of one exemplary microstructure-transferring stamp of the invention.

Now the invention is described in detail.

The invention provides a UV-curable silicone pressure-sensitive adhesive (PSA) composition comprising (A) 100 parts by weight of an organopolysiloxane containing two groups having the general formula (1) per molecule, (B) 1 to 200 parts by weight of a monofunctional (meth)acrylate compound free of a siloxane structure, (C) 1 to 1,000 parts by weight of an organopolysiloxane resin comprising (a) units having the general formula (2), (b) $R^4{}_3SiO_{1/2}$ units wherein $R^4$ is a $C_1$-$C_{10}$ monovalent hydrocarbon group, and (c) $SiO_{4/2}$ units, a molar ratio of the total of units (a) and (b) to units (c) being in the range of from 0.4:1 to 1.2:1, and (D) 0.01 to 20 parts by weight of a photopolymerization initiator, the composition being free of a non-crosslinkable organopolysiloxane resin.

(A) Organopolysiloxane

Component (A) used herein serves as a crosslinking component in the inventive composition. It is an organopolysiloxane based on a backbone consisting essentially of repeating diorganosiloxane units and containing two groups having the general formula (1) per molecule.

[Chem. 3]

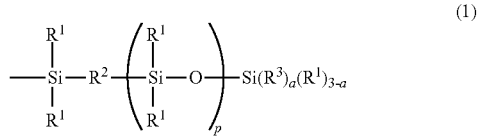

(1)

In formula (1), $R^1$ is each independently a $C_1$-$C_{20}$ monovalent hydrocarbon group, preferably $C_1$-$C_{10}$, more preferably $C_1$-$C_8$ monovalent hydrocarbon group exclusive of aliphatic unsaturated groups. $R^2$ is oxygen or a $C_1$-$C_{20}$, preferably $C_1$-$C_{10}$, more preferably $C_1$-$C_5$ alkylene group. $R^3$ is each independently an acryloyloxyalkyl, methacryloyloxyalkyl, acryloyloxyalkyloxy or methacryloyloxyalkyloxy group, p is a number of 0 to 10, and "a" is a number of 1 to 3.

In formula (1), the $C_1$-$C_{20}$ monovalent hydrocarbon group $R^1$ may be straight, branched or cyclic. Examples thereof include alkyl groups such as methyl, ethyl, n-propyl, isopropyl, n-butyl, isobutyl, tert-butyl, n-hexyl, cyclohexyl, n-octyl, 2-ethylhexyl and n-decyl; alkenyl groups such as vinyl, allyl (or 2-propenyl), 1-propenyl, isopropenyl and butenyl; aryl groups such as phenyl, tolyl, xylyl and naphthyl; and aralkyl groups such as benzyl, phenylethyl and phenylpropyl.

Also included are substituted forms of the foregoing monovalent hydrocarbon groups in which some or all of the carbon-bonded hydrogen atoms are substituted by other substituent groups, for example, halo-substituted hydrocarbon groups and cyano-substituted hydrocarbon groups such as chloromethyl, bromoethyl, trifluoropropyl and cyanoethyl.

Of these, $R^1$ is preferably a $C_1$-$C_5$ alkyl group or phenyl, more preferably methyl, ethyl or phenyl.

The $C_1$-$C_{20}$ alkylene group $R^2$ may be straight, branched or cyclic, and examples thereof include methylene, ethylene, propylene, trimethylene, tetramethylene, isobutylene, pentamethylene, hexamethylene, heptamethylene, octamethylene, nonamethylene, and decylene.

Of these, $R^2$ is preferably oxygen, methylene, ethylene, or trimethylene, more preferably oxygen or ethylene.

The alkyl (alkylene) group in the acryloyloxyalkyl, methacryloyloxyalkyl, acryloyloxyalkyloxy or methacryloyloxyalkyloxy group $R^3$ preferably has 1 to 10 carbon atoms, more preferably 1 to 5 carbon atoms although the carbon count is not particularly limited. Examples of the alkyl group include the groups exemplified above for $R^1$, but of 1 to 10 carbon atoms.

Specific examples of $R^3$ are shown below, but not limited thereto.

[Chem. 4]

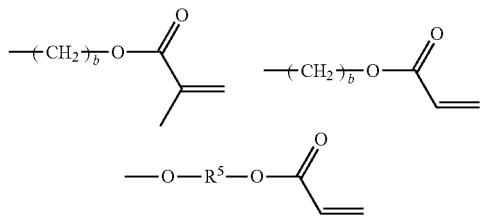

Herein b is a number of 1 to 4, and $R^5$ is a $C_1$-$C_{10}$ alkylene group.

The subscript p is a number of 0 to 10, preferably 0 or 1, and "a" is a number of 1 to 3, preferably 1 or 2.

In the organopolysiloxane as component (A), the position of attachment of the group having formula (1) in the molecule may be the end of the molecular chain or a non-terminal position of the molecular chain (i.e., midway or side chain of the molecular chain) or both. It is desirable in view of flexibility that the position of attachment be only the end.

The organopolysiloxane as component (A) contains silicon-bonded organic groups other than the groups having formula (1) in its molecule, examples of which include the groups exemplified above for $R^1$, preferably $C_1$-$C_{12}$, more preferably $C_1$-$C_{10}$ monovalent hydrocarbon groups exclusive of aliphatic unsaturated groups.

Examples of the hydrocarbon groups include the groups exemplified above for $R^1$. For ease of synthesis, alkyl, aryl and halogenated alkyl groups are preferred, with methyl, phenyl and trifluoropropyl being more preferred.

The molecular structure of component (A) is basically a linear structure or branched structure (inclusive of a linear structure which is branched in part of the backbone) in which the backbone consists of repeating diorganosiloxane units. In particular, preference is given to a linear diorganopolysiloxane which is blocked with the groups having formula (1) at both ends of the molecular chain.

Component (A) may be a homopolymer of such molecular structure, a copolymer of such molecular structure, or a mixture of two or more of these polymers.

The organopolysiloxane as component (A) should preferably have a viscosity at 25° C. of 10 to 100,000 mPa·s, more preferably 10 to 50,000 mPa·s, from the aspect of improving the workability of the composition and dynamic properties of a cured product thereof. In the case of linear organopolysiloxane, this viscosity range generally corresponds to a number average degree of polymerization (DOP) in the range of about 10 to about 2,000, preferably about 50 to about 1,100. As used herein, the viscosity is measured by a rotational viscometer such as BL, BH, BS, cone plate type or rheometer (the same holds true, hereinafter).

As used herein, the DOP (or molecular weight) is a number average DOP (or number average molecular weight) as measured by gel permeation chromatography (GPC) versus polystyrene standards using toluene or the like as the developing solvent (the same holds true, hereinafter).

Examples of the organopolysiloxane as component (A) include those having the following formulae (3) to (5), but are not limited thereto.

[Chem. 5]

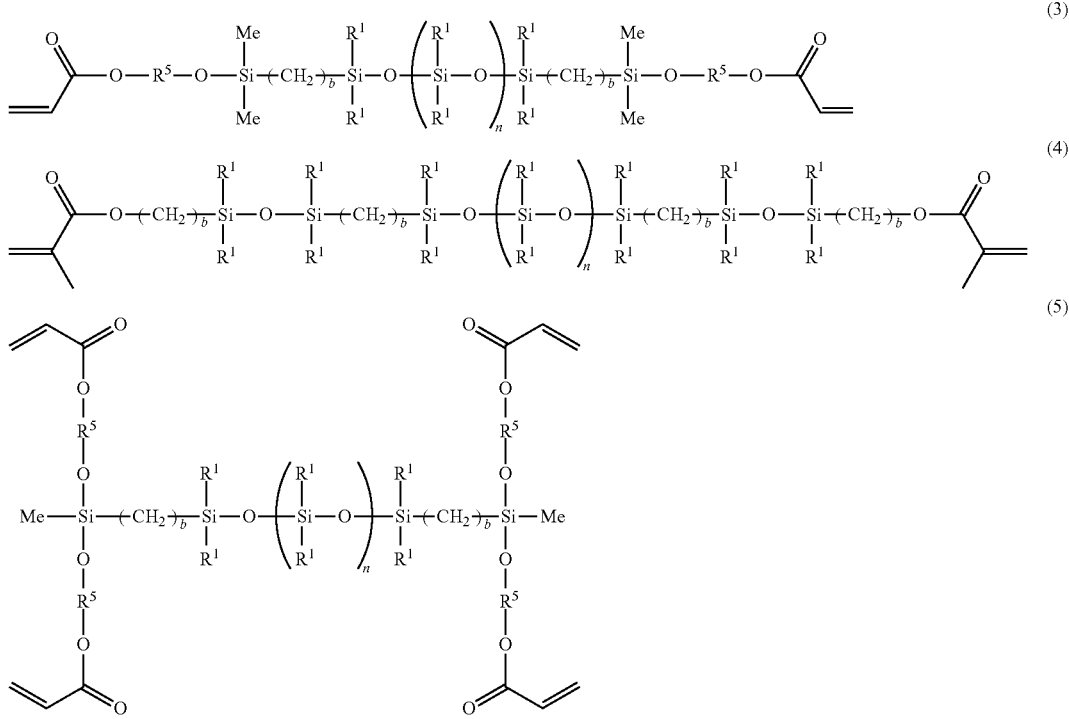

Herein, $R^1$, $R^5$ and b are as defined above, Me stands for methyl, and n is such a number that the organopolysiloxane may have a viscosity in the above range, preferably a number of 1 to 800, more preferably 50 to 600.

These organopolysiloxanes may be prepared by any well-known methods. For example, a polysiloxane having the above formula (3) may be obtained by reacting the hydrosilylation reaction product of a both end dimethylvinylsiloxy-capped dimethylsiloxane/diphenylsiloxane copolymer and chlorodimethylsilane, with 2-hydroxyethyl acrylate.

An organopolysiloxane having the above formula (4) may be obtained as the hydrosilylation reaction product of a both end dimethylvinylsiloxy-capped dimethylsiloxane/diphenylsiloxane copolymer and 3-(1,1,3,3-tetramethyldisiloxanyl)propyl methacrylate (CAS No. 96474-12-3).

An organopolysiloxane having the above formula (5) may be obtained by reacting the hydrosilylation reaction product of a both end dimethylvinylsiloxy-capped dimethylsiloxane/diphenylsiloxane copolymer and dichloromethylsilane, with 2-hydroxyethyl acrylate.

(B) Siloxane Structure-Free Monofunctional (Meth)Acrylate Compound

Examples of the monofunctional (meth)acrylate compound free of a siloxane structure as component (B) include isoamyl acrylate, lauryl acrylate, stearyl acrylate, ethoxy-diethylene glycol acrylate, methoxy-triethylene glycol acrylate, 2-ethylhexyl diglycol acrylate, phenoxyethyl acrylate, phenoxydiethylene glycol acrylate, tetrahydrofurfuryl acrylate, and isobornyl acrylate, which may be used alone or in admixture of two or more.

Of these, isobornyl acrylate is most preferred.

In the practice of the invention, the monofunctional (meth)acrylate compound as component (B) is added in an amount of 1 to 200 parts by weight per 100 parts by weight of component (A). If the amount of component (B) added is less than 1 part by weight per 100 parts by weight of component (A), the composition is less curable and a cured product thereof is short in strength and adhesion. Although the viscosity of the overall composition can be adjusted by increasing the amount of component (B) added, the desired adhesion is not available when the amount exceeds 200 parts by weight relative to 100 parts by weight of component (A).

In particular, the amount of component (B) added is preferably 5 to 100 parts by weight per 100 parts by weight of component (A).

(C) Organopolysiloxane Resin

Component (C) is another crosslinking component in the inventive composition. It is an organopolysiloxane resin comprising (a) units having the general formula (2) ($M^4$ units), (b) $R^4{}_3SiO_{1/2}$ units (M units), and (c) $SiO_{4/2}$ units (Q units) and having a (meth)acryloyloxy-containing group. $R^4$ is a $C_1$-$C_{10}$ monovalent hydrocarbon group.

[Chem. 6]

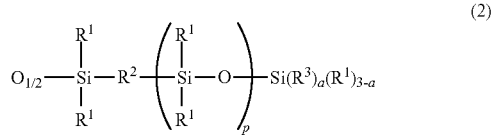

(2)

Herein $R^1$, $R^2$, $R^3$, a and p are as defined above.

Examples of the $C_1$-$C_{10}$ monovalent hydrocarbon group $R^4$ include those exemplified above for $R^1$, but of 1 to 10 carbon atoms. Inter alia, $C_1$-$C_5$ alkyl groups such as methyl, ethyl, n-propyl, and n-butyl and $C_6$-$C_{10}$ aryl groups such as phenyl and tolyl are preferred, with methyl, ethyl and phenyl being more preferred.

It is noted that like $R^1$, some or all of the carbon-bonded hydrogen atoms in the monovalent hydrocarbon group $R^4$ may be substituted by other substituent groups.

In component (C), (a) units having formula (2) ($M^4$ units), (b) $R^4{}_3SiO_{1/2}$ units (M units), and (c) $SiO_{4/2}$ units (Q units) are included in such a molar ratio that a ratio of ($M^4$ units+M units) to Q units may range from 0.4:1 to 1.2:1. If the molar ratio of ($M^4$ units+M units) is less than 0.4, the viscosity of a composition may become very high. If the molar ratio exceeds 1.2, the dynamic properties of a cured product may decline.

For adjusting the viscosity of a composition and the dynamic properties of a cured product in more adequate ranges, it is preferred that the molar ratio of ($M^4$ units+M units) to Q units be in the range from 0.6:1 to 1.21:1.

Also, the rubber properties of a cured product can be adjusted in terms of the molar ratio of $M^4$ units M units. From the aspect of strength of a cured product, the ratio of $M^4$ units to M units is preferably from 0.01:1 to 1:1, more preferably from 0.05:1 to 0.5:1.

The amount of the organopolysiloxane resin added as component (C) is 1 to 1,000 parts by weight, preferably 5 to 500 parts by weight, more preferably 10 to 200 parts by weight per 100 parts by weight of component (A). An amount of less than 1 part by weight may give a cured product with low rubber strength whereas an amount in excess of 1,000 parts by weight may result in low adhesive force.

(D) Photopolymerization Initiator

Examples of the photopolymerization initiator which can be used herein include 2,2-diethoxyacetophenone, 2,2-dimethoxy-1,2-diphenylethan-1-one (Irgacure 651 by BASF), 1-hydroxycyclohexyl phenyl ketone (Irgacure 184 by BASF), 2-hydroxy-2-methyl-1-phenyl-propan-1-one (Irgacure 1173 by BASF), 2-hydxoxy-1-{4-[4-(2-hydroxy-2-methylpropionyl)benzyl]phenyl}-2-methyl-propan-1-one (Irgacure 127 by BASF), phenylglyoxylic acid methyl ester (Irgacure MBF by BASF), 2-methyl-1-[4-(methylthio)phenyl]-2-morpholinopropan-1-one (Irgacure 907 by BASF), 2-benzyl-2-dimethylamino-1-(4-morpholinophenyl)-1-butanone (Irgacure 369 by BASF), bis(2,4,6-trimethylbenzoyl)phenylphosphine oxide (Irgacure 819 by BASF), and (2,4, 6-trimethylbenzoyl)diphenylphosphine oxide (Irgacure TPO by BASF), which may be used alone or in admixture of two or more.

Of these, 2,2-diethoxyacetophenone, 2-hydroxy-2-methyl-1-phenyl-propan-1-one (Irgacure 1173 by BASF), bis(2,4,6-trimethylbenzoyl)phenylphosphine oxide (Irgacure 819 by BASF), and (2,4,6-trimethylbenzoyl)diphenylphosphine oxide (Irgacure TPO by BASF) are preferred in view of compatibility with component (A).

The amount of the photopolymerization initiator added is 0.01 to 20 parts by weight per 100 parts by weight of component (A). An amount of less than 0.01 part by weight leads to a shortage of cure whereas an amount in excess of 20 parts by weight adversely affects deep section cure.

(E) Finely Divided Silica

Component (E) is finely divided silica which is an optional component for adjusting the viscosity of the composition. Examples thereof include fumed silica (dry silica) and precipitated silica (wet silica), with fumed silica (dry silica) being preferred. Blending of component (E) is effective for further increasing the hardness of a cured product and suppressing any positional shift during transportation of parts or chips.

The specific surface area of component (E) is preferably 50 to 400 m²/g, more preferably 100 to 350 m²/g, though not particularly limited. If the specific surface area is less than 50 m²/g, the composition may be insufficiently thixotropic. If the specific surface area exceeds 400 m²/g, the composition may have an excessively high viscosity and become poorly workable. It is noted that the specific surface area is measured by the BET method.

The finely divided silica as component (E) may be used alone or in admixture of two or more.

The finely divided silica may be used as such or after treatment with a surface hydrophobizing agent.

In the latter case, finely divided silica which is pretreated with a surface treating agent may be used. Alternatively, a surface treating agent is added during milling of finely divided silica whereby surface treatment is performed at the same time as milling.

Suitable surface treating agents include alkylalkoxysilanes, alkylchlorosilanes, alkylsilazanes, and silane coupling agents. The agents may be used alone, or more than one agent may be added at the same time or at different points of time.

When component (E) is used in the inventive composition, the amount of component (E) added is preferably 1 to 200 parts by weight, more preferably 5 to 150 parts by weight, even more preferably 10 to 100 parts by weight per 100 parts by weight of component (A).

(F) Antistatic Agent

Component (F) is an antistatic agent which is an optional component that plays the role of reducing surface resistivity and imparting antistatic properties to a material. Suitable antistatic agents include salts of alkali metals and alkaline earth metals and ionic liquids. As used herein, the ionic liquids refer to molten salts which are liquid at room temperature (25° C.), known as room-temperature molten salts, especially those having a melting point of 50° C. or lower, preferably −100° C. to 30° C., more preferably −50° C. to 20° C. These ionic liquids are characterized by such properties as lack of vapor pressure (non-volatility), high heat resistance, non-inflammability and chemical stability.

Suitable salts of alkali metals and alkaline earth metals include salts of alkali metals such as lithium, sodium and potassium, and salts of alkaline earth metals such as calcium and barium. Illustrative examples thereof include alkali metal salts such as $LiClO_4$, $LiCF_3SO_3$, $LiN(CF_3SO_2)_2$, $LiAsF_6$, LiCl, NaSCN, KSCN, NaCl, NaI, and KI, and alkaline earth metal salts such as $Ca(ClO_4)_2$ and $Ba(ClO_4)_2$.

Of these, lithium salts such as $LiClO_4$, $LiCF_3SO_3$, $LiN(CF_3SO_2)_2$, $LiAsF_6$, and LiCl are preferred in view of low resistivity and solubility, with $LiCF_3SO_3$ and $LiN(CF_3SO_2)_2$ being most preferred.

The ionic liquid consists of a quaternary ammonium cation and an anion. The quaternary ammonium cation takes the form of imidazolium, pyridinium or cation of the formula: $R^6_4N^+$ wherein $R^6$ is each independently hydrogen or a $C_1$-$C_{20}$ organic group.

Examples of the organic group represented by $R^6$ include $C_1$-$C_{20}$ monovalent hydrocarbon groups and alkoxyalkyl groups. Specifically, exemplary are alkyl groups such as methyl, pentyl, hexyl and heptyl, aryl groups such as phenyl, tolyl, xylyl and naphthyl, aralkyl groups such as benzyl and phenethyl, cycloalkyl groups such as cyclopentyl, cyclohexyl and cyclooctyl, and alkoxyalkyl groups such as ethoxyethyl (—$CH_2CH_2OCH_2CH_3$). It is noted that two of organic groups $R^6$ may bond together to form a ring structure. In this case, two groups $R^6$, taken together, form a divalent organic group. The main chain of the divalent organic group may consist of carbon or may contain a heteroatom such as oxygen or nitrogen therein. Exemplary are divalent hydrocarbon groups, e.g., $C_3$-$C_{10}$ alkylene groups and groups of the formula: —$(CH_2)_c$—O—$(CH_2)_d$— wherein c is an integer of 1 to 5, d is an integer of 1 to 5, and c+d is an integer of 4 to 10.

Examples of the cation of the formula: $R^6_4N^+$ include methyltri-n-octylammonium, ethoxyethylmethylpyrrolidinium, and ethoxyethylmethylmorpholinium cations.

Examples of the anion include, but are not limited to, $AlCl_4^-$, $Al_3Cl_{10}^-$, $Al_2Cl_7^-$, $ClO_4^-$, $PF_6^-$, $BF_4^-$, $CF_3SO_3^-$, $(CF_3SO_2)_2N^-$, and $(CF_3SO_2)_3C^-$, with $PF_6^-$, $BF_4^-$, $CF_3SO_3^-$, and $(CF_3SO_2)_2N^-$ being preferred.

The antistatic agents may be used alone or in admixture of two or more.

From the aspects of antistatic properties and heat resistance, the amount of component (F) added is preferably 0.001 to 10 parts by weight, more preferably 0.005 to 10 parts by weight per 100 parts by weight of component (A).

A cured product obtained from the inventive UV-curable silicone PSA composition preferably has such antistatic properties that in an antistatic test of using Static Honestmeter (Shisido Electrostatic, Ltd.), charging the surface of the cured product with a static electricity of 6 kV by a corona discharge, and measuring the time passed until the charged voltage decays to half, the half-life is within 2 minutes, more preferably within 1 minute.

It is noted that the inventive composition is free of a non-crosslinkable organopolysiloxane resin as mentioned above.

Typical of the non-crosslinkable organopolysiloxane resin is an organopolysiloxane resin comprising (d) $R^4_3SiO_{1/2}$ units wherein $R^4$ is as defined above and (e) $SiO_{4/2}$ units wherein units (d) and units (e) are in a molar ratio of from 0.4:1 to 1.2:1, which is generally used to impart pressure-sensitive adhesion to cured products.

In the inventive composition, additives such as colorants (pigments or dyes), silane coupling agents, adhesive aids, polymerization inhibitors, antioxidants, UV absorbers or light-resistance stabilizers, and photo-stabilizers may be blended insofar as the benefits of the invention are not compromised.

Moreover, the inventive composition may be used in admixture with another resin composition.

The UV-curable silicone PSA composition of the invention may be obtained by mixing and agitating components (A) to (D) and optionally components (E) and (F) and other components in an arbitrary order. The device used in such operation as agitation is not particularly limited and a mortar, three-roll mill, ball mill or planetary mixer may be used. A combination of such devices is acceptable.

The UV-curable silicone PSA composition of the invention has a viscosity of preferably up to 5,000 Pa·s, more preferably up to 3,000 Pa·s, even more preferably up to 1,500 Pa·s, as measured at 23° C. by a rotational viscometer, in view of efficiency of coating and molding. If the viscosity exceeds 5,000 Pa·s, workability may be markedly exacerbated.

The UV-curable silicone PSA composition of the invention quickly cures upon exposure to UV radiation.

Examples of the light source for UV irradiation include UV LED lamps, high-pressure mercury lamps, ultrahigh pressure mercury lamps, metal halide lamps, carbon arc lamps, and xenon lamps.

The dose (or accumulative light quantity) of UV radiation is preferably 1 to 10,000 mJ/cm$^2$, more preferably 10 to 8,000 mJ/cm$^2$ for curing a sheet of about 2.0 mm thick molded from the composition. That is, on use of UV radiation with an illuminance of 100 mW/cm$^2$, UV may be irradiated for about 0.01 to about 100 seconds.

In the practice of the invention, the adhesive force of the cured product obtained through UV irradiation, though not particularly limited, is preferably 0.001 to 100 MPa, more preferably 0.01 to 50 MPa in view of the balance between release and hold of transferring objects.

The UV-curable silicone PSA composition of the invention may be utilized as PSA articles after coating the composition to various substrates and curing the coating with UV.

As the substrate, plastic films, glass, metals or the like may be used without any limits.

Suitable plastic films include polyethylene film, polypropylene film, polyester film, polyimide film, polyvinyl chloride film, polyvinylidene chloride film, polyvinyl alcohol film, polycarbonate film, polystyrene film, ethylene-vinyl acetate copolymer film, ethylene-vinyl alcohol copolymer film, and triacetylcellulose film.

The glass is not particularly limited in thickness and type, and chemically strengthened glass is acceptable.

For improving the adhesion between a substrate and a PSA layer, the substrate which is previously subjected to primer treatment or plasma treatment may be used.

The coating step may be suitably selected from well-known coating techniques including a spin coater, comma coater, lip coater, roll coater, die coater, knife coater, blade coater, rod coater, kiss coater, gravure coater, screen printing, dip coating, and cast coating.

Since the UV-curable silicone PSA composition of the invention is of solventless type, the potting process using a mold is possible as the means of preparing a cured product.

Although air bubbles can be entrained during pouring into the mold for potting, such bubbles may be removed under reduced pressure. The mold which can be used herein is, for example, a resist mold in which a silicon wafer is provided with a desired protrusion/recess structure using photoresist.

When it is desired to take out the cured product from the mold at the end of curing, the mold is preferably treated with a parting agent prior to the pouring of the composition. Fluorine and silicone based agents may be used as the parting agent.

Most often the UV-curable silicone PSA composition of the invention is used as such. When some improvements in handling and coating to substrates are necessary, it is acceptable that the composition is diluted with an organic solvent prior to use, insofar as the benefits of the invention are not impaired.

The cured product of the inventive UV-curable silicone PSA composition should preferably have a tensile strength of at least 1 MPa, more preferably at least 2 MPa as measured according to JIS-K6249:2003 at a thickness of 2.0 mm, as viewed from the aspect of preventing cohesive failure during molding and transferring of small-size parts such as chips.

Figure 2:
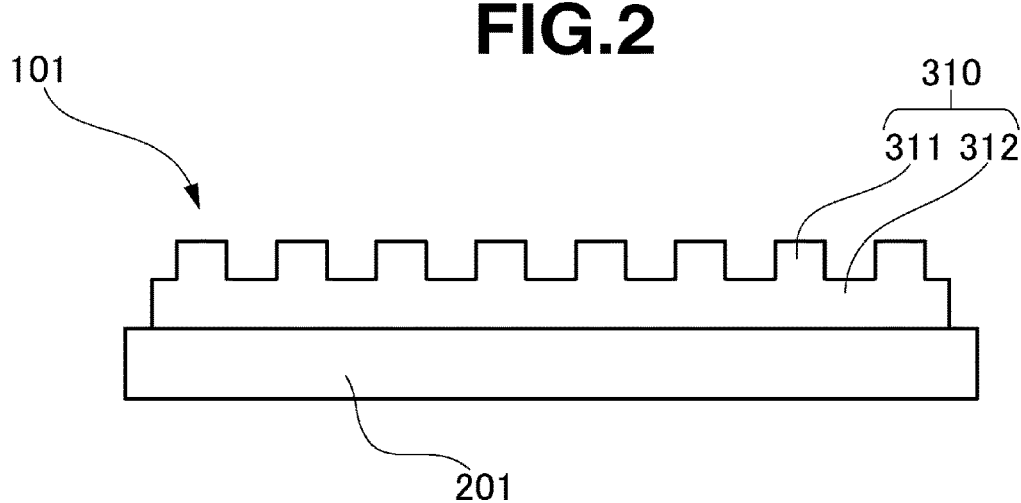
FIG. 2 is a schematic view of another exemplary microstructure-transferring stamp of the invention.

As shown in FIGS. 1 and 2, the cured product of the inventive UV-curable silicone PSA composition may be utilized as microstructure-transferring stamps 100 and 101 for transferring microscopic parts or chips.

Referring to FIG. 1, the microstructure-transferring stamp 100 is constructed as comprising a substrate 200 and a cured product layer 300 of the inventive UV-curable silicone PSA composition thereon. The size of the cured product layer 300 falls within the confines of substrate 200 and may be just equal to the substrate 200.

The material of the substrate 200 is not particularly limited and examples thereof include plastic films, glass, synthetic quartz, metals and the like. Also, the substrate 200 is not particularly limited in thickness and type, and chemically strengthened substrates are acceptable. For improving the adhesion between the substrate and the PSA layer, the substrate which is previously subjected to primer or plasma treatment may be used. Synthetic quartz having a high flatness is advantageously used for suppressing any positional shift during transfer of microstructures to increase the transfer accuracy.

The method of preparing the cured product 300 on the substrate 200, which is not particularly limited, may be either a method of directly coating the uncured UV-curable silicone PSA composition on the substrate 200 and curing or a method of bonding a sheet-form cured product of the UV-curable silicone PSA composition to the substrate 200, for example.

In the method of directly coating the UV-curable silicone PSA composition on the substrate 200 and curing, the microstructure-transferring stamp 100 is obtained by coating the silicone PSA composition on the substrate 200 and curing the coating via UV irradiation.

The coating step may be suitably selected from well-known coating techniques including a spin coater, comma coater, lip coater, roll coater, die coater, knife coater, blade coater, rod coater, kiss coater, gravure coater, screen printing, dip coating, and cast coating.

In this method, after the silicone PSA composition is coated onto the substrate, the coating may be cured via UV irradiation while performing press molding or compression molding. Then the microstructure-transferring stamp 100 having a high flatness is obtained.

In the method of bonding a sheet-form cured product of the UV-curable silicone PSA composition to the substrate 200, the microstructure-transferring stamp 100 is obtained by molding the composition into a sheet and bonding the sheet to the substrate 200.

The step of molding the UV-curable silicone PSA composition into a sheet may be suitably selected from molding techniques such as roll molding, press molding, transfer molding, and compression molding. Preferably the sheet-form cured product is molded while it is sandwiched between plastic films, for the purposes of preventing deposition of dust or debris and reducing oxygen inhibition during curing. If the resulting sheet-form cured product is larger than the desired size, it may be cut to the desired size.

For improving the adhesion between the sheet-form cured product and the substrate 200, the bonding surface of either one or both thereof may be subjected to plasma treatment, excimer treatment or chemical treatment. Further, for improving the bonding strength, a PSA or adhesive agent may be used. Examples of the PSA or adhesive agent used herein include silicone, acrylic and epoxy based agents.

The bonding step may use a roll laminator, vacuum press or the like.

The silicone PSA cured product layer 300 in the microstructure-transferring stamp 100 has a thickness of preferably 1 µm to 10 mm, more preferably 10 µm to 5 mm from the aspects of molding and flatness.

Referring to FIG. 2, the microstructure-transferring stamp 101 is constructed as comprising a substrate 201 and a cured product layer 310 of the inventive UV-curable silicone PSA composition thereon. The substrate 201 used herein may be the same as the substrate 200. The silicone PSA cured product layer 310 has protrusion structures 311 on its surface. A base layer 312 may be disposed under the protrusion structures 311.

The method of forming the cured product layer 310 on the substrate 201 is not particularly limited, and examples thereof include a method of directly molding the cured product layer 310 on the substrate 201 via mold shaping or the like, and a method of bonding a sheet-form cured product having the protrusion structures 311 to the substrate 201.

Figure 3:
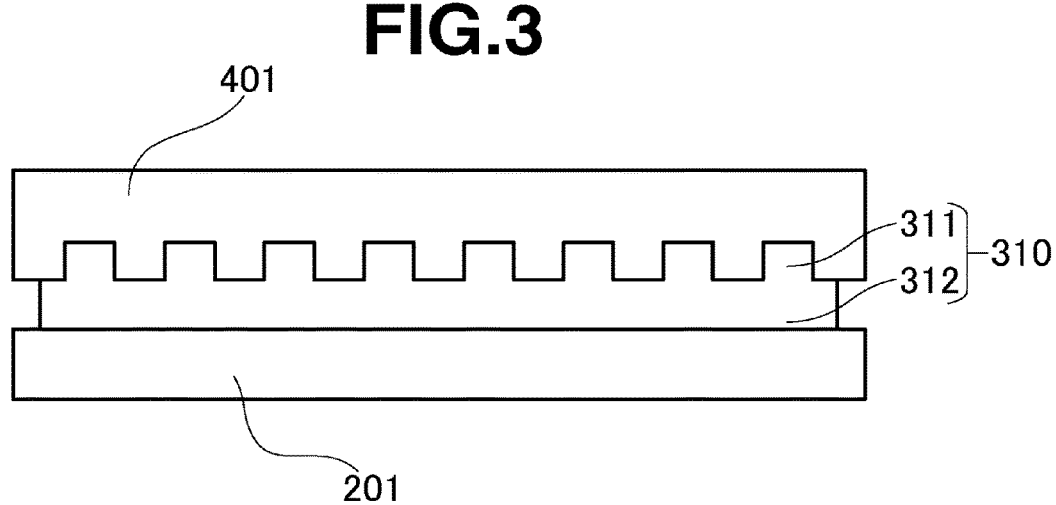
FIG. 3 is a schematic view of one exemplary method for preparing a microstructure-transferring stamp of the invention.

In the method of directly molding the cured product layer 310 on the substrate 201 via mold shaping, the microstructure-transferring stamp 101 is obtained by charging the silicone PSA composition between the substrate 201 and a mold 401, curing the composition via UV irradiation, and removing the mold 401 as shown in FIG. 3.

The mold 401 used herein may be, for example, a resist mold obtained by forming a protrusion/recess pattern of photoresist on a silicon wafer or quartz substrate, or a resin mold obtained by patternwise exposing a UV-curable resin to UV to form a protrusion/recess pattern. In the case of the resin mold, various plastic films may be used as the support.

The step of charging the silicone PSA composition between the substrate 201 and the mold 401 may include coating the silicone PSA composition to either one or both of the substrate 201 and the mold 401 and bonding them together. The coating and bonding steps may use the above-mentioned techniques. Although there is a possibility that tiny bubbles are left in the mold 401 during coating, the problem can be solved by vacuum bonding or debubbling under reduced pressure.

The microstructure-transferring stamp 101 is obtained by coating the silicone PSA composition to the substrate by any of the aforementioned techniques, and curing the composition via UV irradiation while performing press molding, compression molding or roll press molding.

Alternatively, the microstructure-transferring stamp 101 is obtained by the technique of printing the silicone PSA composition through a mesh screen having the desired pattern, and curing the composition via UV irradiation. Since the silicone PSA composition of the invention has shape retainability, the desired pattern shape is not deformed from the coating step to the end of curing step.

In the method of bonding a sheet-form cured product having the protrusion structures 311 to the substrate 201, the microstructure-transferring stamp 101 is obtained by molding the silicone PSA composition into a sheet-form cured product having the protrusion structures 311 and bonding it to the substrate 201.

The step of molding the UV-curable silicone PSA composition into a sheet-form cured product having protrusion structures 311 may be suitably selected from molding techniques such as roll molding, press molding, transfer molding, and compression molding in a mold having the same protrusion/recess pattern as the mold 401.

Preferably the sheet-form cured product is molded while it is sandwiched between plastic films, for the purposes of preventing deposition of dust or debris and reducing oxygen inhibition during curing. If the resulting sheet-form cured product is larger than the desired size, it may be cut to the desired size.

For improving the adhesion between the sheet-form cured product and the substrate 201, the bonding surface of them may be subjected to plasma treatment, excimer treatment or chemical treatment. Further, for improving the bonding strength, any of the aforementioned PSA or adhesive agents may be used.

The bonding step may use a roll laminator, vacuum press or the like.

The size and arrangement of the protrusion structures 311 may be designed in accordance with the desired size and arrangement of microstructures to be transferred.

The top surface of the protrusion structure 311 is flat while its planar shape is not limited and may be circular, oval or rectangular. In the case of a rectangular protrusion structure, the edges may be rounded. The top surface of the protrusion structure 311 has a width of preferably 0.1 µm to 10 mm, more preferably 1 µm to 1 mm.

The side surface of the protrusion structure 311 is not limited in shape and may be either perpendicular or oblique.

The protrusion structure 311 has a height of preferably 0.1 µm to 10 mm, more preferably 1 µm to 1 mm.

Adjacent protrusion structures 311 are spaced apart at a pitch of preferably 0.1 µm to 100 mm, more preferably 1 µm to 1 mm.

The base layer 312 has a thickness of preferably 0.1 µm to 10 mm, more preferably 1 µm to 5 mm.

The microstructure-transferring stamp defined above may be mounted to a tool and utilized as a microstructure transferring apparatus. The means of mounting to a tool is not limited and may be vacuum chucking, PSA sheet or the like. The microstructure-transferring apparatus operates to transfer microstructures such as chips by picking up the microstructures via adhesion of the microstructure-transferring stamp, moving to the desired destination, and releasing the microstructures.

For example, in the laser lift-off (LLO) process of lifting off a sapphire substrate from a GaN based compound crystal layer of a semiconductor device using laser light, the microstructure-transferring stamps 100 and 101 shown in FIGS. 1 and 2 may be used as a microstructure-holding substrate (donor substrate) for temporarily fixing the separated semiconductor chips to prevent any positional shift. By performing laser irradiation in the state that the microstructure-holding substrate is adhesively bonded to semiconductor chips, the separated semiconductor chips are transferred and temporarily fixed on the microstructure-holding substrate.

Further, using the microstructure-transferring stamp 100 or 101 having a greater adhesive bonding force than the microstructure-holding substrate, the semiconductor chips temporarily fixed onto the microstructure-holding substrate can be selectively picked up. Thereafter, the picked-up semiconductor chips are moved to the desired position on a substrate on which they are to be mounted, the semiconductor chips are bonded to the mounting substrate by soldering, and the microstructure-transferring stamp is separated from the semiconductor chips. In this way, the steps of transferring and mounting of semiconductor chips to and on a substrate are accomplished.

EXAMPLES

Examples and Comparative Examples are given below for further illustrating the invention although the invention is not limited to these Examples.

It is noted that the following compounds are used as various components in Examples. Herein Me stands for methyl, Ph for phenyl, and Vi for vinyl.

Component (A)

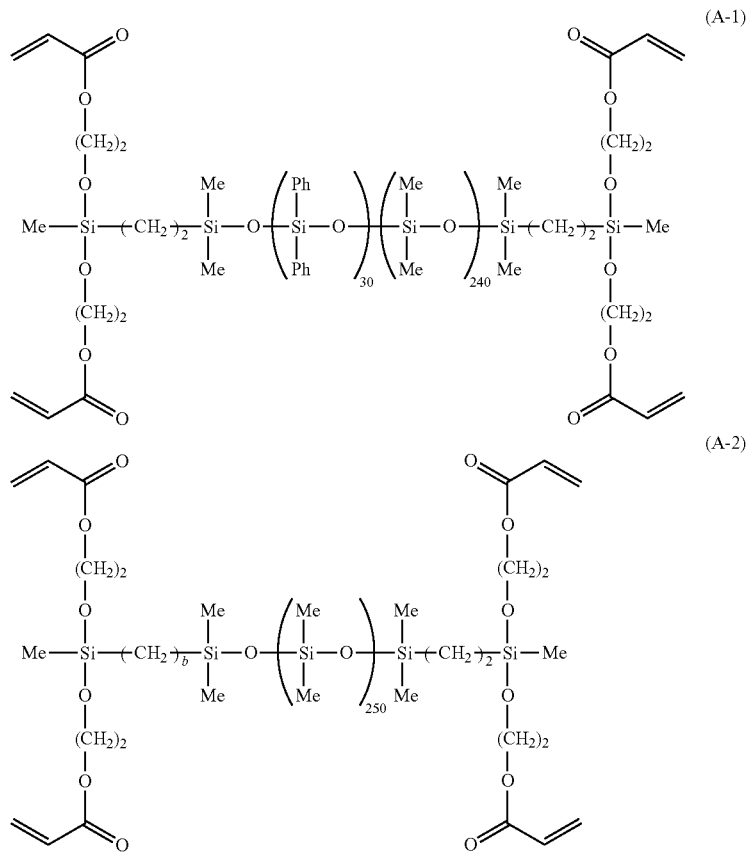

In the formulae, siloxane units in parentheses are arranged in an arbitrary order.

Component (B)
(B-1) isobornyl acrylate (Light Acrylate IB-XA by Kyoeisha Chemical Co., Ltd.)

Component (C)
(C-1) 50 wt % xylene solution of an organopolysiloxane resin containing methacryloyloxy-containing units having the formula (6) shown below, ViMe$_2$SiO$_{1/2}$ units, Me$_3$SiO$_{1/2}$ units and SiO$_2$ units wherein a molar ratio of (methacryloyloxy-containing units)/(ViMe$_2$SiO$_{1/2}$ units)/(Me$_3$SiO$_{1/2}$ units)/(SiO$_2$ units) is 0.07/0.10/0.67/1.00, and having a number average molecular weight of 5,700

(C-2) 50 wt % xylene solution of an organopolysiloxane resin containing methacryloyloxy-containing units having the formula (6) shown below, ViMe$_2$SiO$_{1/2}$ units, Me$_3$SiO$_{1/2}$ units and SiO$_2$ units wherein a molar ratio of (methacryloyloxy-containing units)/(ViMe$_2$SiO$_{1/2}$ units)/(Me$_3$SiO$_{1/2}$ units)/(SiO$_2$ units) is 0.11/0.06/0.67/1.00, and having a number average molecular weight of 6,000

[Chem. 8]

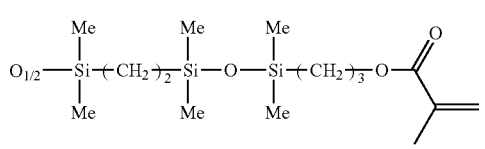

Component (D)
(D-1) 2-hydroxy-2-methyl-1-phenyl-propan-1-one (Irgacure 1173 by BASF Japan)

Component (E)
(E-1) dry silica (Reolosil DM-30S by Tokuyama Corp., specific surface area 230 m$^2$/g)

Component (F)
(F-1) adipate containing 20 wt % of LiN(SO$_2$CF$_3$)$_2$

Examples 1 to 8 and Comparative Examples 1, 2

Each of the silicone compositions in Table 1 was prepared by mixing components (A) and (C) in the formulation in Table 1, distilling off xylene at 100° C. under reduced pressure, adding and mixing components (B), (D), (E) and (F). The viscosity of the compositions in Table 1 is measured at 23° C. by a rotational viscometer.

Using Eye UV electron controller (model UBX0601-01 by Eye Graphics Co., Ltd.), the silicone composition thus prepared was cured in nitrogen atmosphere at room temperature (25° C.) by irradiating UV radiation of wavelength 365 nm in a UV dose of 4,000 mJ/cm$^2$. The sheet had a thickness of 2.0 mm. The cured product was measured for hardness and tensile strength according to JIS-K6249: 2003.

The adhesive bonding force of the cured product was measured by a compact table-top tester EZ-SX (Shimadzu Corp.). Specifically, a stainless steel (SUS) probe of 1 mm square was pressed against the cured product in the form of 1-mm thick sheet at 1 MPa for 15 seconds, after which a load required in pulling back the probe at a speed of 200 mm/min was measured.

The cured product was examined for antistatic properties by using Static Honestmeter (Shisido Electrostatic, Ltd.), charging the surface of the cured product in the form of 2-mm thick sheet with a static electricity of 6 kV by a corona discharge, and measuring the time (half-life) passed until the charged voltage decayed to half.

[Chem. 1]

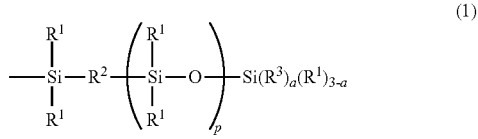

wherein $R^1$ is each independently a $C_1$-$C_{20}$ monovalent hydrocarbon group, $R^2$ is oxygen or a $C_1$-$C_{20}$ alkylene group, $R^3$ is each independently an acryloyloxyalkyl, meth-

TABLE 1

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Composition (pbw) | A-1 | 100 | 100 | 100 | 100 | | 100 | 100 | 100 | 100 | 100 |
| | A-2 | | | | | 100 | | | | | |
| | B-1 | 20 | 50 | 20 | 20 | 20 | 20 | 20 | 20 | 20 | 250 |
| | C-1 | 160 | 200 | 60 | | 160 | 160 | 160 | 160 | 2.200 | 160 |
| | C-2 | | | | 160 | | | | | | |
| | D-1 | 2 | 2.5 | 1.5 | 3 | 2 | 2 | 2 | 2 | 12 | 5 |
| | E-1 | | | | | | 5 | | 5 | | |
| | F-1 | | | | | | | 0.1 | 0.1 | | |
| Physical properties of composition | Viscosity (mPa·s) | 2,000 | 1,000 | 1,300 | 2,000 | 800 | 27,000 | 2,000 | 25,000 | — | 300 |
| Physical properties of cured product | Hardness (Type A) | 50 | 70 | 30 | 70 | 65 | 60 | 50 | 61 | — | 92 |
| | Tensile strength (MPa) | 4.0 | 5.0 | 4.0 | 5.0 | 7.5 | 3.8 | 3.8 | 3.5 | — | 8.9 |
| | Adhesive force (MPa) | 0.6 | 0.3 | 0.1 | 0.3 | 0.1 | 0.5 | 0.5 | 0.5 | — | <0.01 |
| | Half-life@6 kV | ≥10 min | ≥10 min | ≥10 min | ≥10 min | ≥10 min | ≥10 min | 1 sec | 1 sec | — | ≥10 mm |

As seen from Table 1, the UV-curable silicone PSA compositions prepared in Examples 1 to 8 have an adequate viscosity. Their cured products have excellent adhesion and tensile strength and are useful as a temporary adhesive for transferring microscopic parts such as chips. Examples 7 and 8 having component (F-1) blended therein have excellent antistatic properties.

In contrast, Comparative Example 1 containing too much component (C-1) outside the inventive range demonstrates that the composition solidifies and is difficult to handle. Comparative Example 2 containing too much component (B-1) outside the inventive range demonstrates that the composition becomes resinous and develops no adhesive force and is unsuitable as a temporary adhesive.

REFERENCE SIGNS LIST

100, 101: microstructure-transferring stamp
200, 201: substrate
300, 310: cured product layer
311: protrusion structure
312: base layer
401: mold

The invention claimed is:
1. A UV-curable silicone pressure-sensitive adhesive composition comprising:
  (A) 100 parts by weight of an organopolysiloxane containing per molecule two groups having the general formula (1):

acryloyloxyalkyl, acryloyloxyalkyloxy or methacryloyloxyalkyloxy group, p is a number of 0 to 10, and "a" is a number of 1 to 3,
  (B) 1 to 200 parts by weight of a monofunctional (meth) acrylate compound free of a siloxane structure,
  (C) 1 to 1,000 parts by weight of an organopolysiloxane resin comprising (a) units having the general formula (2):

[Chem. 2]

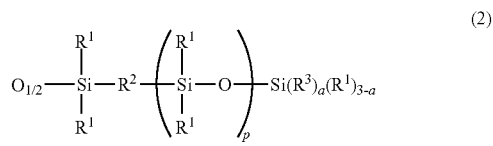

wherein $R^1$, $R^2$, $R^3$, a, and p are as defined above, (b) $R^4_3SiO_{1/2}$ units wherein $R^4$ is a $C_1$-$C_{10}$ monovalent hydrocarbon group, and (c) $SiO_{4/2}$ units, a molar ratio of the total of units (a) and (b) to units (c) being in the range of from 0.4:1 to 1.2:1, and
  (D) 0.01 to 20 parts by weight of a photopolymerization initiator,
the composition being free of a non-crosslinkable organopolysiloxane resin, wherein the monofunctional (meth)acrylate compound free of a siloxane structure (B) is at least one of isoamyl acrylate, lauryl acrylate, stearyl acrylate, ethoxy-diethylene glycol acrylate, methoxy-triethylene glycol acrylate, 2-ethylhexyl diglycol acrylate, phenoxyethyl acrylate, phenoxydiethylene glycol acrylate, tetrahydrofurfuryl acrylate, and isobornyl acrylate.

2. The UV-curable silicone pressure-sensitive adhesive composition of claim 1, further comprising (E) 1 to 20 parts by weight of finely divided silica per 100 parts by weight of component (A).

3. The UV-curable silicone pressure-sensitive adhesive composition of claim 1, further comprising (F) 0.001 to 10 parts by weight of an antistatic agent per 100 parts by weight of component (A).

4. A cured product of the UV-curable silicone pressure-sensitive adhesive composition of claim 1.

5. The cured product of claim 4 having a tensile strength of at least 1 MPa according to JIS-K6249 at a thickness of 2.0 mm.

6. A pressure-sensitive adhesive agent comprising the cured product of claim 4.

7. A pressure-sensitive adhesive sheet comprising the cured product of claim 4.

8. A microstructure-transferring stamp comprising the cured product of claim 4.

9. The microstructure-transferring stamp of claim 8 having at least one protrusion structure.

10. A microstructure-transferring apparatus comprising the microstructure-transferring stamp of claim 8.

* * * * *